United States Patent
Gardner et al.

[11] Patent Number: 5,830,421
[45] Date of Patent: Nov. 3, 1998

[54] MATERIAL AND SYSTEM FOR CATALYTIC REDUCTION OF NITROGEN OXIDE IN AN EXHAUST STREAM OF A COMBUSTION PROCESS

[75] Inventors: Timothy J. Gardner, Albuquerque; Stephen E. Lott, Edgewood; Steven J. Lockwood; Linda I. McLaughlin, both of Albuquerque, all of N. Mex.

[73] Assignee: Low Emissions Technologies Research and Development Partnership, Dearborn, Mich.

[21] Appl. No.: 675,065

[22] Filed: Jul. 3, 1996

[51] Int. Cl.⁶ .................................................. B01J 8/00
[52] U.S. Cl. ..................................... 423/213.2; 423/213.5; 423/239.1; 422/171; 422/177; 502/242; 502/339; 502/349; 502/350
[58] Field of Search ..................................... 422/177, 171, 422/180, 217, 222; 423/213.2, 213.5, 239.1; 502/339, 349, 350, 353, 242; 60/299, 301

[56] References Cited

U.S. PATENT DOCUMENTS

| | | | |
|---|---|---|---|
| 4,511,455 | 4/1985 | Dosch et al. | 208/10 |
| 4,769,356 | 9/1988 | Takeuchi et al. | 423/213.2 |
| 4,929,582 | 5/1990 | Dosch et al. | 502/11 |
| 5,233,830 | 8/1993 | Takeshima et al. | 60/301 |
| 5,461,022 | 10/1995 | Dosch et al. | 502/11 |

OTHER PUBLICATIONS

Oberlander, "Aluminas for Catalysts—Their Preparation and Properties", Applied Industrial Catalysis, vol. 3, 1984.

T.–R. Viljava et al Dry adsorption processes for removal of SOx and $NO_x$ in flue gas—a review, 5 Paperi ja Puu 401 (1986).

A. A. Siddiqi et al NOx controls in review, Hydrocarbon Processing, 115, (1981).

M. D. Amiridis et al Selective Catalytic reduction of nitric oxide by hydrocarbons, 10 App. Catal. B, 203 (1996).

T. J. Truex, et al, Catalysts for Nitrogen Oxides Control under lean burn condition, 36(1) Plat. Met. Rev., 2 (1992).

S. Sato et al, Iron ion–exchanged zeolite, 12 Catal. Lett. 193 (1992).

W. Held et al, Catalytic NOx Reduction in Net oxidizing Exhaust Gas, SAE Technical Paper No. 900496, 13, (1990).

A. Obuchi et al, Performance of Platinum Group Metal Catalysts for the selective reduction of nitrogen oxides by hydrocarbons, Appl. 2 Catal. B, 71 (1993).

H. K. Shin et al, Selective catalyst reduction of NO by ethene in excess oxygen over platinum ion–exchanged MFZ zeolites, 26 Catal. Today, 13 (1995).

A. Takami et al, Development of Lean Burn Catalyst, SAE Technical Paper No. 950746, 1 (1995).

K.C.C. Kharas et al; Deactivation of Pt–ZSMS for selective reduction of NO, 40[4] Prepr. Am. Chem. Soc., Fuel Chem. Div. 1068 (1995).

R. Burch et al, The effect of promoters on $Pt/Al_2O_3$ catalysts for the reduction of NO by $C_3H_6$ under lean burn conditions, 11 Appl. Catal. B. 207 (1997).

(List continued on next page.)

*Primary Examiner*—Hien Tran
*Attorney, Agent, or Firm*—Harness, Dickey & Pierce, P.L.C.

[57] ABSTRACT

A catalytic material of activated hydrous metal oxide doped with platinum, palladium, or a combination of these, and optionally containing an alkali or alkaline earth metal, that is effective for $NO_X$ reduction in an oxidizing exhaust stream from a combustion process is disclosed. A device for reduction of nitrogen oxides in an exhaust stream, particularly an automotive exhaust stream, the device having a substrate coated with the activated noble-metal doped hydrous metal oxide of the invention is also provided.

25 Claims, 7 Drawing Sheets

OTHER PUBLICATIONS

W. Bögner et al, Removal of nitrogen oxides from the exhaust of a lean–line gasoline engine, 7 Appl. Catal. B 153 (1995).

N. Takahashi et al, The new concept 3–way catalyst for automotive lean–burn engine, 27 Catalysis Today, 27 63 (1996).

H. S. Gandhi and M. Shelef, "The Adsorption of Nitric Oxide on Copper Oxides," 28 *Journal of Catalysis* 1 (1973).

Kathleen A. Bethke, David Alt, and Mayfair C. Kung, "NO Reduction by Hydrocarbons in an Oxidizing Atmosphere over Transmission Metal–Zirconium Mixed Oxides," 35 *Catalysis Letters* 37 (1994).

K. A. Bethke, C. Li, M.C. Kung, B. Yang, and H. H. Kung, "The Role of $NO_2$ in the Reduction of NO by Hydrocarbon over $Cu-ZrO_2$ and Cu–ZSM–5 Catalysts," 31 *Catalysis Letters* 287 (1995).

FIG-4

MATERIAL AND SYSTEM FOR CATALYTIC REDUCTION OF NITROGEN OXIDE IN AN EXHAUST STREAM OF A COMBUSTION PROCESS

GOVERNMENT RIGHTS

The U.S. Government may have rights in this invention.

FIELD OF THE INVENTION

This invention relates to devices to reduce nitrogen oxides in an exhaust or effluent stream from a combustion process, such as from an internal combustion engine, and, in particular, to a device in a combustion apparatus having a substrate coated with an activated noble metal-doped hydrous metal oxide material that is capable of reducing the nitrogen oxides in the exhaust stream to nitrogen.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are nitrogen oxide compounds ($NO_x$), hydrocarbons, and carbon monoxide. There are a wide variety of combustion processes producing these emissions, for instance, coal- or oil-fired furnaces, reciprocating internal combustion engines (including gasoline and diesel engines), gas turbine engines, and so on. In each of these combustion processes, control measures to prevent or diminish atmospheric emissions of $NO_x$, hydrocarbons, and carbon monoxide are needed.

Industry has devoted considerable effort to reducing regulated emissions from the exhaust streams of combustion processes. In particular, it is now usual in the industry to place a catalytic converter in the exhaust system of gasoline engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metal impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a gasoline engine is operating under stoichiometric conditions or nearly stoichiometric conditions with respect to the fuel : air ratio (just enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel : air ratio having 0.1–0.3%excess oxygen, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere.

The exhaust stream from a diesel engine also has a substantial oxygen content, from perhaps about 2–18% oxygen. It is also believed that other combustion processes result in emissions of $NO_x$, hydrocarbons, and carbon monoxide that are difficult or expensive to control because of an oxidizing effluent stream or poor conversion of the compounds using conventional means.

In spite of efforts over the last decade to develop a catalytic converter effective for reducing $NO_x$ to nitrogen under oxidizing conditions in a gasoline engine or in a diesel engine, the need for improved conversion effectiveness has remained unsatisfied. The materials developed prior to the present invention have exhibited unacceptably low efficiencies for reduction of $NO_x$ in an oxidizing exhaust stream, even with such high levels of expensive noble metal catalysts as to make them impractical for use by the automotive industry. Moreover, there is a continuing need for improved effectiveness in treating $NO_x$, hydrocarbons, and carbon monoxide emissions from any combustion process.

The industry has also been concerned with the related problem of the temperatures at which catalytic converter devices are effective for reducing nitrogen oxides and other emissions. The standard "three-way" catalyst system is ineffective for treating emissions until a temperature of approximately 250° C., the light-off temperature of the catalyst system, is reached. This threshold temperature for effective operation of the catalytic converter is often referred to as the "light-off" temperature. It would be desirable to reduce the light-off temperature as much as possible because significant amounts of emissions are produced from the time when the engine is started until the catalytic converter is finally heated to the light-off temperature. In addition, diesel engines and engines that are run under lean burn (oxidizing) conditions have lower average operating temperatures, usually in the range of about 150° to 350° C. The conventional three-way catalytic converter systems reach maximum efficiency at temperatures between 400 and 800° C., above the operating temperature ranges of these engines.

We have discovered that a coating of an activated noble metal-doped hydrous metal oxide material on a substrate unexpectedly improves the conversion of nitrogen oxides to nitrogen under oxidizing conditions. The coated substrates of the invention also exhibit reduced light-off temperatures over conventional catalytic converters and can be synthesized to provide maximum effectiveness in the operating temperature ranges of diesel engines and of lean-burn gasoline engines.

SUMMARY OF THE INVENTION

According to the present invention, there is provided material and a device for reducing $NO_x$ in an exhaust stream from a combustion process. The material and device of the invention are particularly useful for $NO_x$ conversion under oxidizing conditions. In addition, the material and device are also useful for catalyzing the oxidation of hydrocarbons and carbon monoxide. While not wishing to be bound by theory, it is believed that the conversion of the $NO_x$, hydrocarbon, and carbon monoxide emissions take place together, and perhaps in interrelated reactions, so that the $NO_x$ can be reduced and hydrocarbons and carbon monoxide oxidized in the same operation.

The material is a catalytic material comprising an activated noble metal-doped hydrous metal oxide. The activated noble metal-doped hydrous metal oxide is coated onto a substrate. The coated substrate may be prepared according to one of two methods. The first method is a direct coating method in which a precursor to the activated noble metal-doped hydrous metal oxide is coated onto the substrate, and further steps to synthesize the final activated catalyst are conducted after the coating step. The second method of coating a substrate with an activated noble metal-doped hydrous metal oxide material comprises the steps of preparing the activated noble metal-doped hydrous metal oxide material, forming an aqueous slurry of the material, coating the substrate with the material, and calcining the final coated substrate.

The invention further provides an activated noble metal-doped hydrous metal oxide material that includes an amount of sodium effective to broaden the temperature range of appreciable $NO_x$ conversion and a method for making such a material. Yet further, the invention provides a catalytic material comprising an activated noble metal-doped hydrous metal oxide material that includes an amount of silica effective to thermally stabilize the material for temperatures of up to about 1000° C.

The materials and devices of the invention comprise a substrate coated with an activated noble metal-doped hydrous metal oxide, with the noble metal being selected from platinum, palladium, and mixtures of platinum and palladium, and with the metal of the metal oxide being selected from zirconium, titanium, niobium, tantalum, and mixtures of these transition metals. The transition metal oxide material preferably contains silica to provide high-temperature stability. The activated noble metal-doped hydrous metal oxide material may contain up to about 5% sodium by weight in order to broaden the temperature range of appreciable $NO_x$ conversion.

The substrate for the coating is preferably ceramic beads or pellets or a monolith, and it is particularly preferable that, when the substrate is a cordierite honeycomb monolith, the monolith is precoated with γ-alumina or another high-substrate area ceramic.

The devices with the coatings of the invention effectively reduce the nitrogen oxide emissions in oxidizing exhaust streams of engines and other combustion processes, and offer the further advantage of lower light-off temperatures for conversion of emissions in the exhaust stream.

The present invention further provides a method of reducing $NO_x$ in the exhaust stream of an internal combustion engine by placing the device of the invention in contact with the exhaust stream, and an automotive exhaust emission control system.

DETAILED DESCRIPTION OF THE INVENTION

The devices according to the invention comprise a substrate coated with an effective amount of an activated noble metal-doped hydrous metal oxide material. The noble metal is selected from platinum, palladium, or a mixture of platinum and palladium. The metal of the metal oxide is a transition metal selected from zirconium, titanium, niobium, tantalum, and mixtures of these metals. The activated, noble metal-doped hydrous metal oxide material is capable of catalyzing the reduction of $NO_x$ to nitrogen and of facilitating oxidation of hydrocarbon and carbon monoxide. While not in any way limiting our invention by the theory of operation, we believe that the hydrous metal oxide materials of the invention exhibit improved $NO_x$ reduction capability at least in part because of the increased surface area and increased number of active metal sites on the surface of these materials as compared to the materials currently used in catalytic converters for internal combustion engines. The substrates of the present invention coated with the activated hydrous metal oxide materials are effective for reducing $NO_x$ from the exhaust stream even with relatively low amounts of the expensive noble metals.

In general, the activated hydrous metal oxide material is prepared through the steps of forming an intermediate sol in a lower alcohol by the reaction of an alkali or alkaline earth metal hydroxide dissolved in the lower alcohol with a transition metal alkoxide. The alcohol used preferably has up to 8 carbon atoms, more preferably up to 4 carbon atoms, and it is particularly preferred to use methanol. The intermediate is then hydrolyzed to form a hydrous metal oxide containing the alkali or alkaline earth metal cation. An ion exchange of the hydrous metal oxide with the doping noble metal or metals follows, and, finally, the doped material is calcined to activate the noble metal-doped hydrous metal oxide material. General preparative procedures for catalytic hydrous metal oxide materials are described in Dosch et al., U.S. Pat. No. 4,511,455, Dosch et al., U.S. Pat. No. 4,929,582, and Dosch et al., U.S. Pat. No. 5,461,022, the entire contents of all three patents now being incorporated herein by reference.

The activated noble metal-doped hydrous metal oxide material may be introduced onto a substrate, such as ceramic beads or a cordierite monolith optionally precoated with γalumina, by one of at least two methods. In the first method, hereinafter referred to as the powder slurry method, an aqueous slurry is made of an activated noble metal-doped hydrous metal oxide powder, and is contacted with the target substrate. The first method has the advantage of having the same steps for the manufacturer of ceramic substrates for automotive catalytic converters as methods already used in the industry. The disadvantage of the first method is that thicker films result, using more of the expensive catalyst metals.

For example, the beads or cordierite monolith, with or without the γ-alumina coating, can be coated by the powder slurry method by pouring an approximately 50% solids by weight slurry of the activated noble metal-doped hydrous metal oxide material onto the beads or into the channels of the monolith, pulling the slurry through to the other ends of the channel with vacuum at a rate chosen to deposit the desired thickness of coating. The applied coating is allowed to dry. Drying is preferably accomplished by heating the beads or monolith to about 100° C. under stagnant or forced air conditions. After drying, the applied coating is calcined, preferably by heating the coated substrate to between from about 300° to about 500° C., and particularly preferably at about 425° C., and holding at that temperature for up to 5 hours, preferably 1 hour, thereby producing the final coated substrate.

In the second method, hereinafter referred to as the direct coating method, the target substrate is coated with the solution of the intermediate sol. After removal of excess sol, the sol-coated surface is hydrolyzed, preferably by exposure to atmospheric moisture, to form an ion exchangeable hydrous metal oxide coating. The steps of ion exchange and activation can then be performed to produce an activated noble metal-doped hydrous metal oxide material. The direct coating method is described in Dosch et al., U.S. Pat. No. 5,461,022, and reference is made thereto for further details. The coating deposited by the direct coating method is thinner than with the powder slurry method, resulting in use of a lesser amount of the expensive catalyst metal and metal alkoxides. The direct coating method may also allow a higher dispersion of the metal catalyst particles and a synergism between the hydrous metal oxide coating and the substrate. The disadvantage of the direct coating method is that more process steps (and perhaps more time and equipment) would be required of the manufacturer of the beads or monoliths for catalytic converters.

In particular, the preparation of the preferred embodiments according to the present invention is as follows. All percentages are by weight, based on the weight of the final activated (calcined) noble metal-doped hydrous metal oxide compound or activated noble metal-doped hydrous metal oxide coated substrate, unless expressly stated otherwise. Useful transition metal alkoxides include those wherein each alkoxide ligand has up to 8, preferably up to 4, carbon atoms, for example, titanium methoxide, titanium ethoxide, titanium n-propoxide, titanium isopropoxide, titanium n-butoxide, titanium isobutoxide, titanium sec-butoxide, titanium tert-butoxide, titanium 2-ethylhexoxide, zirconium methoxide, zirconium ethoxide, zirconium n-propoxide, zirconium isopropoxide, zirconium n-butoxide, zirconium isobutoxide, zirconium sec-butoxide, and zirconium tert-butoxide. Further useful alkoxide compounds are listed in Dosch et al., U.S. Pat. No. 4,511,455 and Dosch et al., U.S. Pat. No. 5,461,022. The transition metal alkoxide may also have mixed ligands. Titanium alkoxide compounds are commercially available from DuPont under the trade names TYZOR®. The transition metal methoxide is selected from titanium methoxide, zirconium methoxide, niobium methoxide, and tantalum methoxide. Titanium methoxide and zirconium methoxide are preferred. The transition metal methoxide may be used as a starting material or may be formed in situ in the methanol reaction solvent by using a higher alkoxide. The compounds with alkoxide ligands having three or four carbon atoms are preferred due to easier handling characteristics such as higher flash points and lower toxicity.

It is particularly preferred for some applications to include silicates, such as tetraalkylorthosilicates, in the synthesis of the hydrous metal oxide materials. When the activated noble metal-doped hydrous metal oxide material further includes silica, the material has greater thermal stability, being stable at temperatures of up to 1000° C. One preferred silicate is tetraethylorthosilicate. The silicate material is mixed with the transition metal alkoxide prior to the reaction with the alkali or alkaline earth metal hydroxide. While the theory of how the silica functions in the hydrous metal oxide material is unimportant to making and using the invention, it is believed that the presence of silica inhibits metal oxide particle growth and high temperature crystallization to prevent loss of surface area. This can be beneficial when the device is used for treating the exhaust stream from an automotive engine because of possible temperature spikes under certain conditions, such as engine misfire, at which times the device of the present invention might experience temperatures as high as 1000° C. for a brief period of time. When silica is included, it may be included in a molar ratio of transition metal to silicon of from about 4:1 to about 6:1. A preferred ratio is 5 moles of transition metal, preferably of titanium or zirconium, to 1 mole of silicon. The tetraalkylorthosilicate is mixed with the transition metal alkoxide, alcohol, and hydroxide to produce a co-network with silicon-oxygen, transition metal-oxygen, and silicon-oxygen-transition metal bonds.

The hydroxide used is selected from alkali metal and alkaline earth metal hydroxides. Preferred hydroxides include sodium hydroxide, potassium hydroxide, lithium hydroxide, ammonium hydroxide, tetramethyl ammonium hydroxide, barium hydroxide, calcium hydroxide, and strontium hydroxide. Sodium hydroxide is particularly preferred. The alkali or alkaline earth metal hydroxide is dissolved in the methanol, preferably at approximately 10% by weight. The exact concentration is not critical, but an excess of the methanol helps to facilitate both the alcohol exchange reaction and the reaction between the transition metal alkoxide and tetraalkylorthosilicate, as well as enhance solubility of the intermediate. The transition metal alkoxide or alkoxide mixture is added to the alkali or alkaline earth metal solution in a molar ratio of about one mole of alkali or alkaline earth metal to from about 2 to about 10 moles, preferably from about 2 to about 3 moles, and particularly preferably about 2.0 moles total of transition metal. The addition is carried out at temperatures up to the boiling point of the solution. The rate of addition is not critical. The alkoxides may be added slowly enough to prevent boiling, or, alternatively, the exotherm may be dissipated by cooling during the reaction, for example by placing the container holding the solution in a water bath, by use of a cooling jacket, or by making the addition in a reactor fitted with a reflux condenser. The reaction is facile and is complete or essentially complete after a couple of minutes with stirring.

The intermediate produced by this reaction is then hydrolyzed. The hydrolysis for the powder slurry method is generally effected by pouring the intermediate solution into water or a mixture of water with other ingredients. Preferably, the intermediate solution is poured into a mixture of water in acetone, for example a mixture of about 11% by weight water in acetone. While the particular ratio of water to acetone is not critical, there is preferably a sufficient amount of water to hydrolyze all of the intermediate that is added. Acetone is one preferred material to use with the water because it aids in the agglomeration of the product and is easily removed in a later drying step. The intermediate is added to the water or aqueous mixture with stirring. The hydrolysis to agglomerated alkali or alkaline earth metal-doped hydrous metal oxide material is complete or essentially complete at room temperatures after a couple of minutes with stirring.

When the direct coating method is used, the substrate to be coated, such as beads or a cordierite monolith, is first soaked in an excess of the soluble intermediate for up to about 24 hours, taking care to remove any trapped air. The excess sol is removed by draining, inert gas purging, vacuum filtration, or other means. The coated material may be hydrolyzed by exposure to ambient moisture. The moisture content of ambient air is usually sufficient to hydrolyze the alkoxides present in the sol coating.

Following hydrolysis, the alkali or alkaline earth metal ions are exchanged for the desired noble metal ions. The noble metal is selected from platinum, palladium, and mixtures of these metals. For activated coated substrates according to the powder slurry method, it is preferred to include up to about 5% of the noble metal, preferably platinum, based on the final weight of the activated noble metal-doped hydrous metal oxide powder. More preferably, from about 0.2 to about 2.0%, and even more preferably from about 0.4 to about 1.3% of the noble metal is included, based on the final weight of the powder. When the activated coated substrates are prepared according to the direct coating method, it is preferred to include up to about 2% of the noble metal, preferably platinum, based on the final weight of the activated coated substrate. More preferably, from about 0.2 to about 1.8%, and even more preferably from about 0.4 to about 1.5% of the noble metal is included, based on the final weight of the activated coated substrate.

In a particularly preferred embodiment, the platinum and palladium are used together. In both the powder slurry and direct coating methods, the addition of small amounts of palladium relative to platinum may be used to reduce the light-off temperature. For example, light-off temperatures of 150°–165° C. can be obtained in this way. When used together, regardless of the coating method, it is preferable to incorporate the platinum and palladium in a ratio of from about 1 to about 20 parts platinum for each part palladium, by weight. A more preferred ratio is from about 2 to about 12 parts platinum for each part palladium, by weight, and a ratio of from about 2 to about 10 parts platinum for each part palladium, by weight, is particularly preferred. For example, one particularly preferred embodiment prepared according to the powder slurry method and having a substantially lower light-off temperature, as compared to a platinum-only doped powder, contains from about 0.7 to about 1.0% platinum and from about 0.1 to about 0.4% palladium, based on the final weight of the activated noble metal-doped hydrous metal oxide powder. Yet another particularly preferred embodiment prepared according to the powder slurry coating method contains about 0.75% platinum and about 0.25% palladium, based on the final weight of the activated noble metal-doped hydrous metal oxide powder. Correspondingly, it is particularly preferred to prepare a coated substrate according to the direct coating method with from about 0.7 to about 1.1% platinum and up to about 0.5% palladium, based on the final weight of the activated coated substrate. Especially preferred is a coated substrate containing from about 0.8 to about 1.1% platinum and up to about 0.2% palladium, based on the final weight of the activated coated substrate.

The noble metal catalyst is prepared by incorporating the noble metal cationic or anionic precursor by cation or anion exchange, respectively. Suitable compounds that can be used as the source of the noble metal cationic precursor include tetraammineplatinum nitrate, tetraamminepalladium nitrate, tetraamminepalladium chloride monohydrate, tetraammineplatinum chloride monohydrate, and palladium metal dissolved in aqua regia. An example of a suitable compound that can be used as the source of the noble metal anionic precursor is hydrogen hexachloroplatinate hydrate. A noble metal cation is usually added by dissolving the salt in water, adding the hydrous metal oxide, bringing the pH to from about to about 7.0 or less, preferably to a pH of about 5.5, and holding at the pH for a sufficient time, preferably for about 30 minutes, to allow the desired extent of ion exchange. When the noble metal is added by anion exchange, a two-step procedure is used. The hydrous metal oxide powder is added to water, and the pH is adjusted to between about 2.0 and about 3.0, preferably to a pH of about 2.5, and maintained at the desired pH for preferably about 30 minutes. The acidified powder is filtered and redispersed, after which the noble metal anionic precursor is added to the water. Again, the pH is held for a sufficient time, preferably for about 30 minutes, to allow the desired extent of ion exchange. The pH is preferably adjusted with a mineral acid, such as 10 wt. % hydrochloric acid or nitric acid. Following the exchange, the aqueous solution is removed and the powder or coated substrate is washed with water and then with acetone and dried. The amount of catalyst metal ion uptake can be determined by atomic absorption spectrometry.

After the ion exchange step, the powder or coated substrate may be acidified by placing in water and adjusting the pH to the desired value. The pH is held at the desired value for a period of time, preferably between 1 and 5 minutes, during which time the pH is adjusted with acid as needed. After the acidification step, the product is removed from the water and is rinsed with deionized water and then, preferably, rinsed with acetone or a similar solvent to aid in drying.

It is particularly preferred to use this acidification procedure to produce activated platinum, palladium, or platinum and palladium doped hydrous metal oxide materials with sodium contents of up to 1% sodium, preferably less than about 0.5% sodium.

It is sometimes advantageous, particularly for the purpose of controlling the width of the temperature range of appreciable effective $NO_x$ conversion for the inventive materials, to retain or reintroduce at least some alkali or alkaline earth metal in the activated noble metal-doped hydrous metal oxide materials. While it has been determined that adding sodium or another alkali or alkaline earth metal will slightly decrease the maximum potential $NO_x$ conversion, the temperature range for the appreciable conversion can be broadened for at least up to about a 50° C. span, preferably up to at least about a 100° C. span, and particularly preferably at least up to about a 150° C. span. In this context, the temperature range of "appreciable $NO_x$ conversion" means the temperature range that includes the particular temperature at which the maximum value is observed, plus all the temperatures at which the $NO_x$ reduction value is at least about 75% of the maximum value.

Alkali metals are preferred for this purpose and it is particularly preferred that the metal incorporated is sodium, and preferably enough sodium is incorporated into the activated hydrous metal oxide or hydrous metal oxide/silica material to broaden the temperature range of appreciable $NO_x$ conversion to a range of at least about 50° C. It is particularly preferred to incorporate enough sodium to broaden the temperature range of appreciable $NO_x$ conversion to a range of at least about 100° C.

The amount of alkali or alkaline earth metal in the material can be monitored by atomic absorption spectrometry and controlled by adjusting the pH at which the ion exchange step is carried out or by limiting the amount of acidification during the acidification step after the ion exchange, or by both methods. Up to perhaps half of the original amount of alkali or alkaline earth metal may be retained in the hydrous metal oxide material after ion exchange. The proper conditions to obtain a material with the desired amount of alkali or alkaline earth metal may easily be determined by analyzing for the metal by atomic absorption spectrometry. The alkali or alkaline earth metal may also be increased after the ion exchange step by an incipient wetness impregnation procedure. In such a procedure, the alkali or alkaline earth metal cation is introduced by addition of an aqueous solution of a salt of that metal, such as by the addition of the corresponding nitrate or hydroxide salt. The sodium or other alkali or alkaline earth metal cation solution is mixed with the noble metal-doped hydrous metal oxide material, and the mixture is allowed to equilibrate. The time allowed for equilibration at room temperature is preferably at least eight hours. Following the equilibration, the sodium- or other alkali metal- or alkaline earth metal-doped material is dried.

As mentioned, it is particularly preferred to include sodium in the activated noble metal-doped hydrous metal oxide material, especially when both platinum and palladium are included. Up to about 5% sodium is included in the material. The sodium content is preferably from about 1 to about 5%, and particularly preferably from about 2 to about 4%, by weight of the activated noble metal-doped hydrous metal oxide material, and it is particularly preferred to use these ranges of sodium with a platinum-doped or a platinum- and palladium-doped hydrous metal oxide material.

In the powder slurry method, after the ion exchange step and any further steps to adjust the sodium or other alkali or alkaline earth metal content, the reaction mixture is filtered using a Buchner funnel to recover the noble metal-doped product. The powder is ground, if necessary, to a −60/+80 mesh particle size range.

The powder or coated substrate is then calcined, for example by heating at about 600° C. for from about 1 to about 3 hours. The noble metal precursor and the hydrous metal oxide are converted during the calcination to crystallized metal particles and metal oxide phases. The calcined material is what is referred to as the activated noble metal-doped hydrous metal oxide material.

As described above, the activated noble metal-doped hydrous metal oxide material is coated by either the powder slurry method or the direct coating method onto a substrate. One preferred substrate is a honeycomb monolith. The honeycomb monolith is preferably a ceramic honeycomb monolith of the type widely used for automotive catalytic converters. These monoliths are well-known in the art. Such monoliths are extruded from synthetic cordierite materials (ideally $Mg_2Al_4Si_5O_{18}$) according to well-known ceramic processes. Honeycomb cordierite monoliths are commercially available from Corning, Inc., Corning, N.Y.; and from NGK-Locke, Inc. The resulting cordierite monolith is a macroporous support for the catalysts that has sufficient channels to both permit the exhaust stream to pass at a rate sufficient to avoid an excessive amount of back pressure that would interfere with proper operation of the engine, and also provide an effective surface area to maximize exposure of the exhaust gases to the $NO_x$ reduction catalyst.

In a particularly preferred embodiment, the cordierite honeycomb monolith is first coated with a layer of γ-alumina. Monoliths with γ-alumina coatings are manufactured commercially for the automotive industry by various companies, such as Allied Signal, Des Plaines, Ill.; Englehard Corp., Jackson, Miss.;, Johnson Matthey, Wayne, Pa.; and Degussa Corp., Dublin, Ohio.

The effective amount of the activated noble metal-doped hydrous metal oxide depends upon the particular application, i.e., the engine operating conditions and the geometry of the coated substrate, and can be optimized by straightforward testing of loading level versus % nitrogen oxide reduction.

Preferably, the device of the invention comprises a cordierite honeycomb monolith precoated with a layer of γ-alumina and then coated with an effective amount of an activated hydrous metal oxide material doped with a member of the group consisting of platinum, palladium, and mixtures thereof; wherein the metal oxide is selected from the group consisting of zirconium oxide, titanium oxide niobium oxide, tantalum oxide, and mixtures thereof. The γ-alumina layer is thought to maximize the surface to which the high-surface area doped hydrous metal oxide material can adhere.

Figure 1:
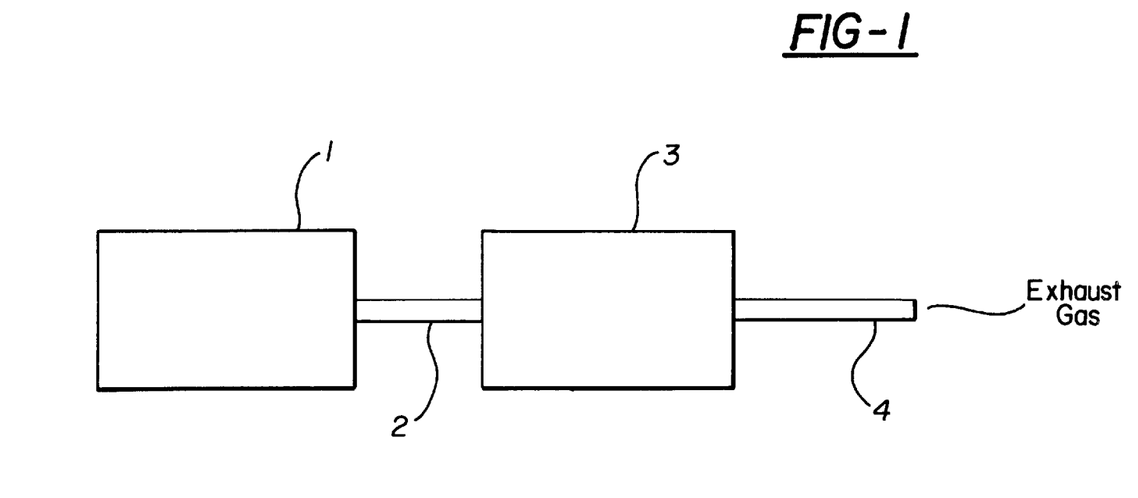
FIG. 1 illustrates a preferred configuration for exhaust systems of the invention.

The device of the invention, which comprises the substrate coated according to the methods described above, is placed in an exhaust stream of a combustion process. The device catalyzes the conversion of the emissions from the combustion process. In particular, the device reduces the $NO_x$ and oxidizes the hydrocarbons and carbon monoxide in the exhaust stream, even under oxidizing conditions. The device is particularly useful in an automotive exhaust system. With reference now to FIG. 1, an automotive exhaust system according to the invention comprises an engine 1 and a exhaust pipe 2 through which the exhaust stream containing the emissions passes to the device of the invention 3. Conversion of the emissions takes place in the device 3. The exhaust stream then passes through the exhaust pipe 4 and is emitted to the atmosphere. The device of the invention would replace a catalytic converter having the conventional three-way catalyst system in known automotive exhaust systems.

Because of the low light-off temperatures and the low temperatures that may be attained for effective operation of the device, the device may be placed as close to the end of the exhaust system as practical.

The invention is further described in the following examples. The examples are merely illustrative and do not in any way limit the scope of the invention as described and claimed.

PREPARATION 1

Preparation of Sodium-Doped Hydrous Titanium Oxide/Silica Material

One mole (284.3 grams) of titanium isopropoxide and 0.2 mole (41.7 grams) of tetraethylorthosilicate were mixed well in a Teflon beaker. A separate Teflon beaker was charged with 200 grams of a 10 by weight solution of sodium hydroxide in methanol (20 grams, 0.5 mole sodium hydroxide). The mixture of titanium isopropoxide and tetraethylorthosilicate was added to the methanolic NaOH slowly (to prevent boiling) with gentle stirring. The resulting solution of the intermediate was warm and clear. The intermediate was then hydrolyzed by pouring the methanol-intermediate solution slowly, with stirring, into a large Teflon beaker containing 1000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

PREPARATION 2

Preparation of Sodium-Doped Hydrous Zirconium Oxide/Silica Material

One mole (327.6 grams) of zirconium n-propoxide and 0.2 mole (41.7 grams) of tetraethylorthosilicate were mixed well in a glass beaker. This mixture was added to ethanol to form zirconium ethoxide (2:1 molar ratio of ethanol to propoxide ligands). The resulting solution was briefly boiled, then cooled to less than 50° C. A separate Teflon beaker was charged with 200 grams of a 10% by weight solution of sodium hydroxide in methanol (20 grams, 0.5 mole sodium hydroxide). The mixture of zirconium ethoxide and tetraethylorthosilicate was added to the methanolic NaOH slowly (to prevent boiling) with gentle stirring. The resulting solution of the intermediate was warm and clear. The intermediate was then hydrolyzed by pouring the methanol-intermediate solution slowly, with stirring, into a large Teflon beaker containing 1000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

METHOD OF EVALUATION FOR EXAMPLES 1–6

The materials prepared in the following Examples 1–6 were evaluated for $NO_x$ conversion capabilities according to the following method.

Nominally 1 gram of the product material was heated to about 500° C. under nitrogen. A reactant gas containing 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide was introduced at a rate of 20 liters gas per hour per cubic centimeter of product material. A scan was conducted from 500° to 125° C. at a rate of 5° C./minute or less to produce a %$NO_x$ conversion curve.

EXAMPLE 1

Preparation of Activated High-Sodium Platinum-Doped Hydrous Titanium Oxide/Silica Material by Cation Exchange A solution of 0.14 grams of $Pt(NH_3)_4(NO_3)_2$ in 100 ml of deionized water was prepared. To this solution was added 10.0 grams of the sodium-doped hydrous titanium oxide/silica material of Preparation 1. The pH was adjusted to about 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder. The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 2:
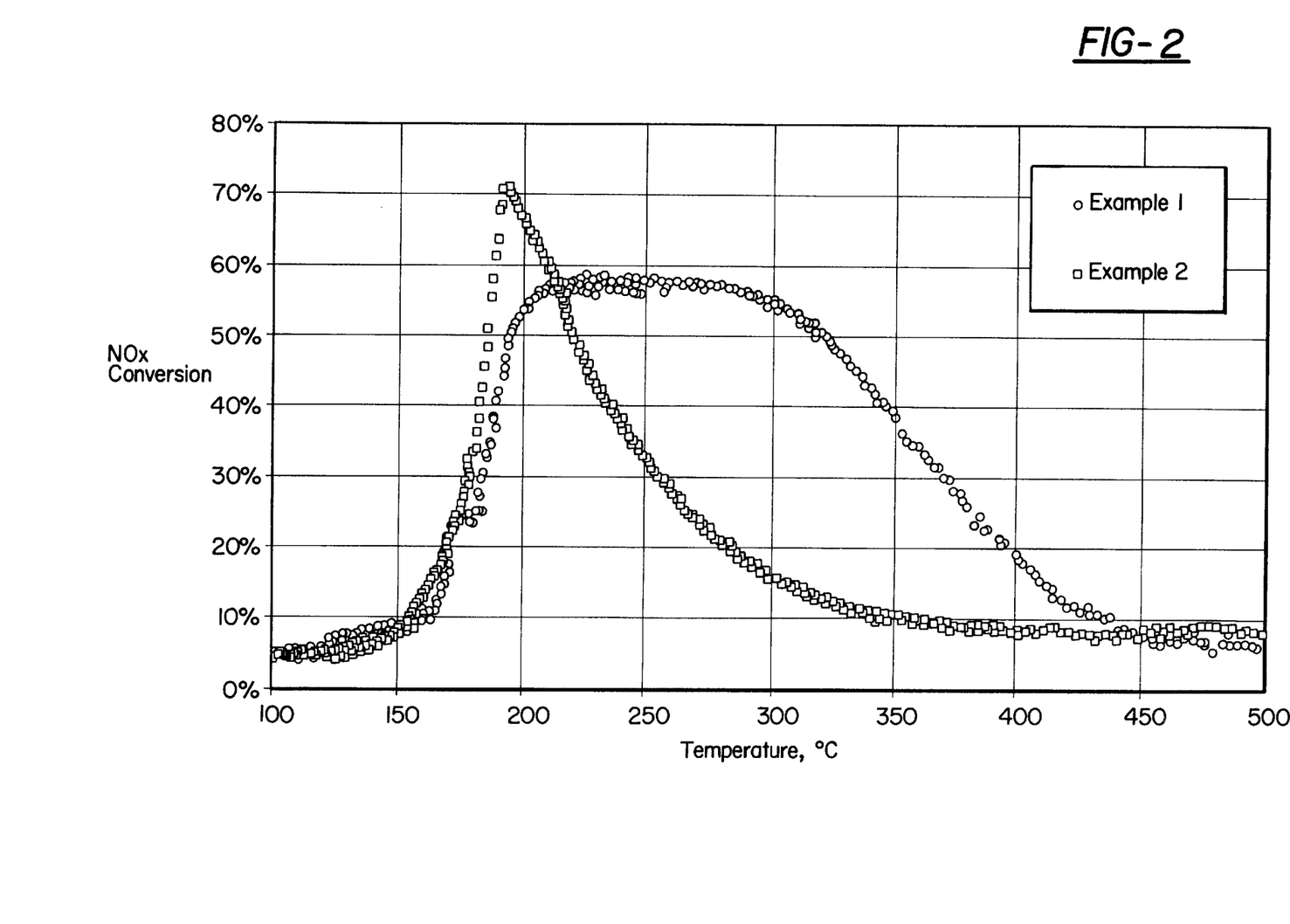
FIGS. 2–7 illustrate $NO_x$ conversion test results for the devices of Examples 1–8.

The prepared product was determined by atomic absorption spectrometry to be 0.94% platinum and 3.32% sodium by weight. The $NO_x$ conversion curve is shown in FIG. 2. The maximum $NO_x$ conversion was 58%, and the conversion window was about 200° C. to about 300° C.

EXAMPLE 2

Preparation of Low-Sodium Platinum-Doped Hydrous Titanium Oxide : Silica by Cation Exchange A solution of 0.14 grams of $Pt(NH_3)_4(NO_3)_2$ in 100 ml of deionized water was prepared. To this solution was added 10.0 grams of the sodium-doped hydrous titanium oxide/silica material of Preparation 1. The pH was adjusted to about 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder.

The high-sodium powder obtained at this point was acidified by slurrying the powder in 100 ml deionized water, adjusting the pH to 4.0 with 10 wt. % nitric acid, and maintaining the slurry at pH 4.0 for 1 minute with dropwise addition of acid as needed. The slurry was filtered using a Buchner funnel and rinsed with three 25-ml portions of deionized water. The acidification step was repeated twice more. After the slurry was filtered for the third time and rinsed with the three 25-ml portions of deionized water, the solid product was rinsed with three 25-ml portions of acetone.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

The prepared product was determined by atomic absorption spectrometry to be 0.97% Pt and 0.48% Na, by weight. The $NO_x$ reduction curve is shown in FIG. 2. The maximum $NO_x$ conversion was 71%.

EXAMPLE 3

Preparation of Activated Low-Sodium Platinum-Doped Hydrous Titanium Oxide/Silica Material by Anion Exchange A portion of 10 grams of the sodium-doped hydrous titanium oxide/silica material of Preparation 1 was slurried in 100 ml of water. This slurry was acidified to pH 2.5 by the addition of 10 wt. % HCl. The slurry was filtered with a coarse porosity, glass frit Buchner funnel. The solid collected was rinsed with three 25-ml portions of deionized water. The filter cake was dispersed again in 100 ml of deionized water and the pH measured. The slurry was acidified to pH 2.5 with 10 wt. % HCl. This step of filtering, rinsing, redispersing, and acidifying was repeated until the initial pH of the slurry was 2.7 or less.

An amount of 0.6 gram $H_2PtCl_6$ was added to the slurry and the slurry was then mixed for 30 min. using a magnetic stir bar and stir plate. The slurry was filtered with a coarse porosity, glass frit Buchner funnel. The solid collected was rinsed with three 25-ml portions of deionized water, and then rinsed with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 3:
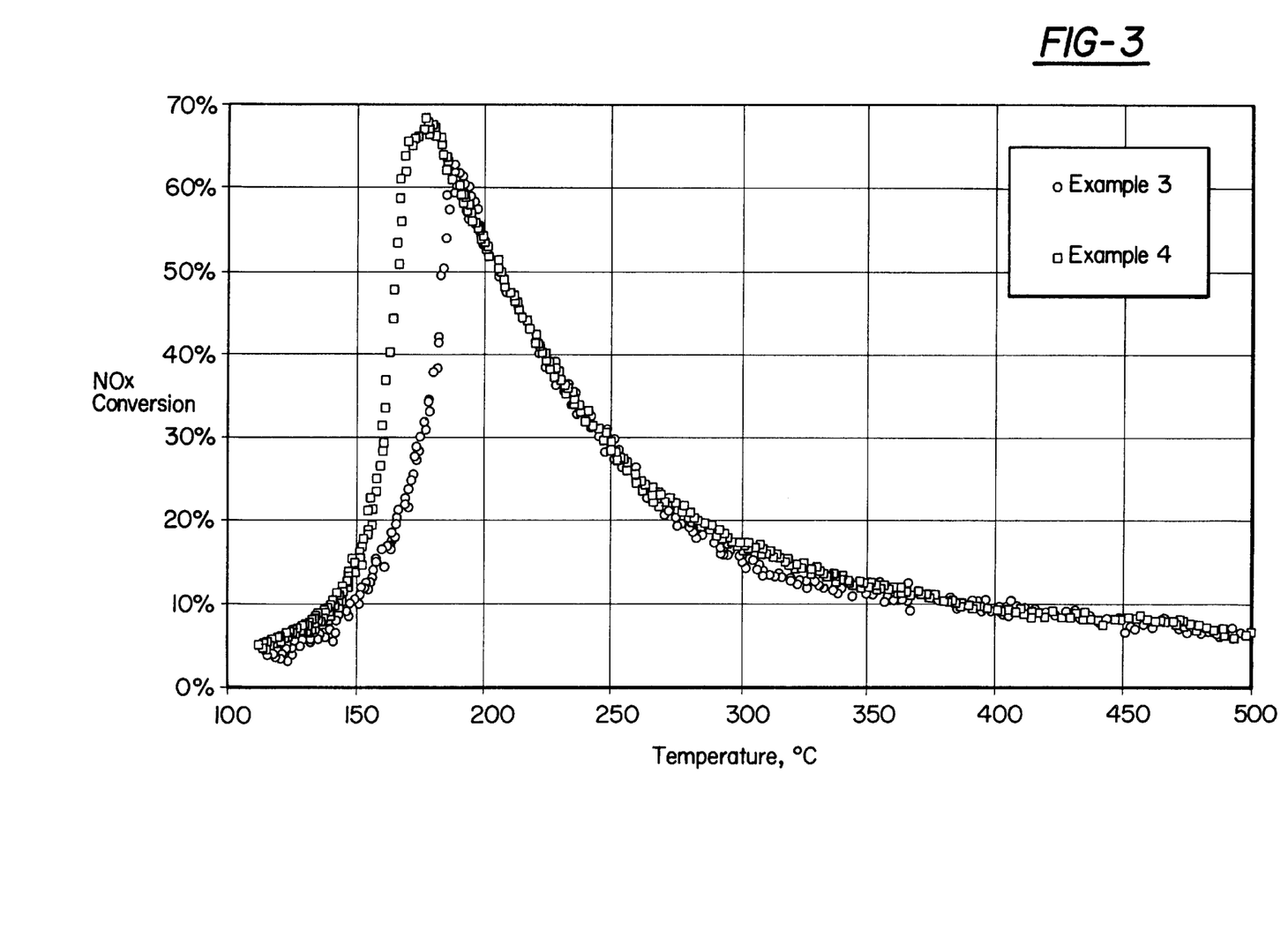

The prepared product was determined by atomic absorption spectrometry to be 0.95% Pt and 0.01% Na, by weight. The $NO_x$ reduction curve is shown in FIG. 3. The maximum $NO_x$ conversion was 68%.

EXAMPLE 4

Preparation of Activated Low-Sodium Platinum-Doped Hydrous Zirconium Oxide/Silica Material by Anion Exchange The procedure of Example 3 was followed, substituting 10 grams of the sodium-doped hydrous zirconium oxide/silica material of Preparation 2 for the sodium-doped hydrous titanium oxide/silica material of Preparation 1.

The prepared product was determined by atomic absorption spectrometry to be 0.97% Pt and 0.01% Na, by weight. The $NO_x$ reduction curve is shown in FIG. 3. The maximum $NO_x$ conversion was 62%.

EXAMPLE 5

Preparation of Activated Low-Sodium Platinum-Doped Hydrous Zirconium Oxide/Silica Material by Cation Exchange A portion of 10 grams of the sodium-doped hydrous zirconium oxide/silica material of Preparation 2 was slurried in 50 ml of deionized water. The slurry was acidified to and stabilized at pH 8 with the addition of 10 wt. % $HNO_3$. In a separate container, 0.16 gram $Pt(NH_3)_4(NO_3)_2$ was dissolved in 50 ml deionized water. The platinum solution was added to the acidified slurry and mixed for 30 minutes using a magnetic stir bar and stir plate. The slurry was filtered using a coarse porosity glass frit Buchner funnel. The solid product was rinsed with three 25-ml portions of deionized water. The filter cake was redispersed in 100 ml deionized water. The redispersed slurry was acidified to pH 4 with 10 wt. % nitric acid and stirred for 1 minute. The acidified slurry was filtered with a coarse porosity glass frit Buchner funnel. The filter cake was rinsed, first with three 25-ml portions of deionized water and then with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 4:
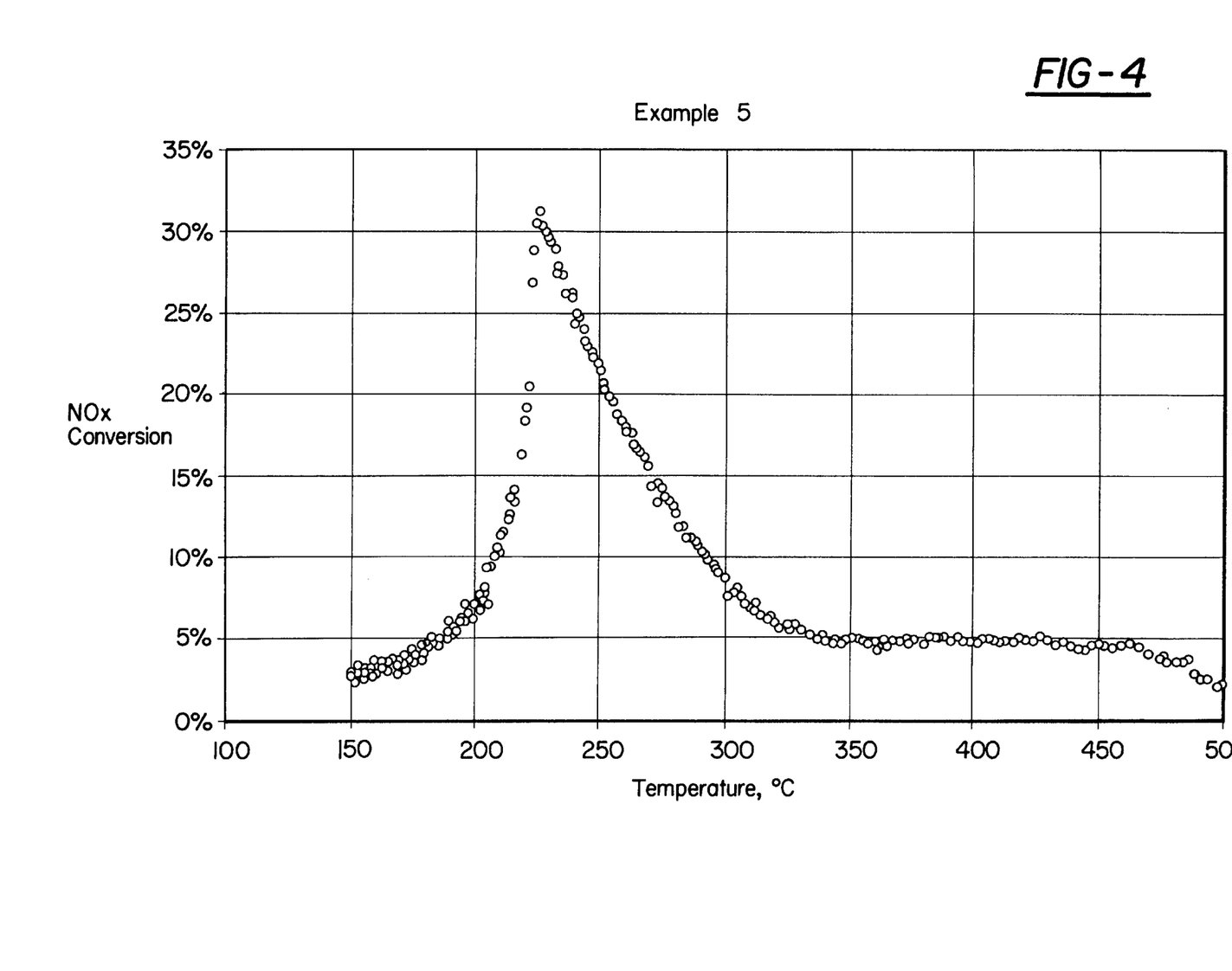

The prepared product was determined by atomic absorption spectrometry to be 0.77% Pt and 0.11% Na, by weight. The $NO_x$ reduction curve is shown in FIG. 4. The maximum $NO_x$ conversion was 31%.

EXAMPLE 6

Preparation of Activated Low-Sodium Platinum- and Palladium-Doped Hydrous Zirconium Oxide/Silica Material by Co-Cation Exchange A 10 wt. % solution of $Pd(NH_3)_4(NO_3)_2$ was made in deionized water. In a suitable container, 0.115 gram $Pt(NH_3)_4(NO_3)_2$ and 0.59 gram of the $Pd(NH_3)_4(NO_3)_2$ solution were dissolved in 100 ml deionized water. Next, 10 grams of the sodium-doped hydrous titanium oxide/silica material of Preparation 1 were added. The slurry was acidified to pH 5.5 with 10 wt. % nitric acid, holding the slurry at pH 5.5 for ten minutes by adding the 10 wt. % nitric acid dropwise as needed. The slurry was filtered using a coarse porosity glass frit Buchner funnel. The solid product was rinsed with three 25-ml portions of deionized water. The filter cake was redispersed in 100 ml deionized water. The redispersed slurry was acidified to pH 4.0 and held at pH 4.0 for one minute with additions of 10 wt. % nitric acid. The acidified slurry was filtered with a coarse porosity glass frit Buchner funnel and rinsed with three 25-ml portions of deionized water. The dispersion and acidification step was repeated twice more. After the final acidification and water rinse, the product was rinsed with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 5:
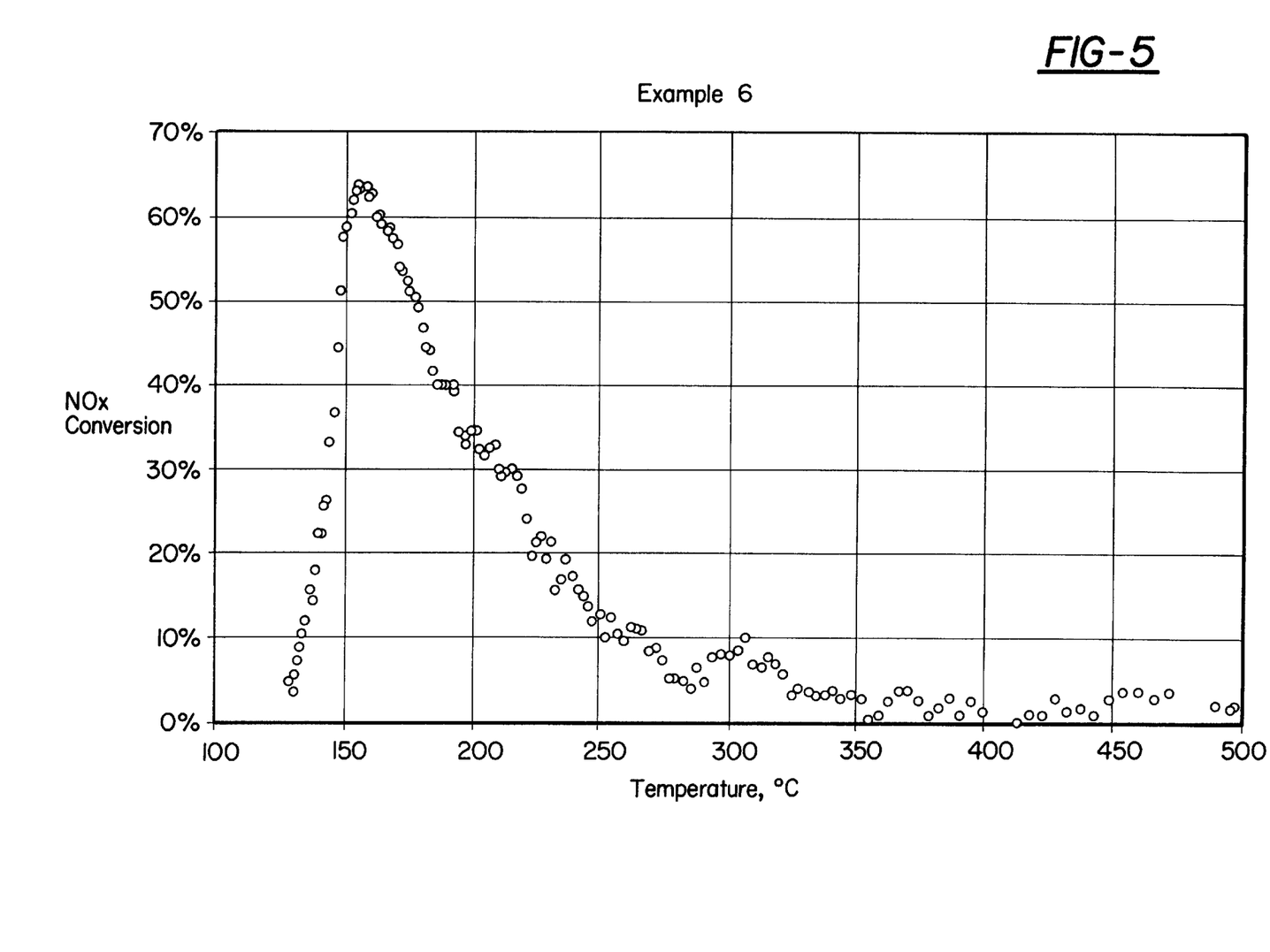

The prepared product was determined by atomic absorption spectrometry to be 0.82% Pt, 0.31% Pd, and 0.64% Na, by weight. The $NO_x$ reduction curve is shown in FIG. 5. The maximum $NO_x$ conversion was 64%.

PREPARATION 3

Preparation of Sodium-Doped Hydrous Titanium Oxide/Silica Coating on a Cordierite Monolith Precoated with γ-Alumina A mixture of 4.2 grams of tetraethylorthosilicate and 28.4 grams titanium isopropoxide was added slowly to a solution of 2 grams NaOH in 20.3 grams methanol. The resulting clear intermediate sol was put into a Teflon bottle with three small cordierite monoliths precoated with γ-alumina. Each monolith was approximately 1.3 cm diameter by 1.0 cm in length and weighed about 0.8 gram. The monoliths were allowed to sit overnight in the coating solution. The three monoliths were then removed from the solution and dried in a dessicator under vacuum. The hydrous titanium oxide material coating was determined to be about 10 wt. % with respect to the overall monolith weight.

METHOD OF EVALUATION FOR EXAMPLES 7–8

The materials prepared in the following Examples 7–8 were evaluated for $NO_x$ conversion capabilities according to the following method.

A nominally 1 centimeter long by 1.3 centimeter diameter cylindrical sample was heated to about 150° C. under nitrogen. A reactant gas containing 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide was introduced at a rate of 50 liters gas per hour per cubic centimeter of sample material. A scan was conducted by increasing the temperature from 150° to 500° C. at 5° C./minute, holding for 20 minutes at 500° C., and then scanning the temperature down from 500°

EXAMPLE 7

Addition of Platinum to the Hydrous Titanium Oxide/Silica Coated γ-Alumina/Cordierite Monolith and Activation A cordierite with 1 wt. % of platinum metal based on total monolith weight was prepared by ion exchange with an excess of platinum.

An approximately 0.9 gram monolith, prepared according to Preparation 3, was suspended in a solution of 0.024 gram $Pt(NH_3)_4(NO_3)_2$ in 50 ml deionized water. The solution was stirred gently and the pH lowered to 5.5 using 0.1 N nitric acid. The solution was held at pH 5.5 for 30 min. by adding 0.01N nitric acid dropwise as needed. The solution was decanted off and the monolith placed in a Buchner funnel. After pulling a vacuum on the flask for about 2 seconds, the monolith was rinsed with three 25-ml portions of deionized water, and then rinsed with three 25-ml portions of acetone. The monolith was dried on the Buchner funnel at room temperature under vacuum for about one hour.

The monolith was heated at 5° C./minute up to 600° C. and then calcined at that temperature for two hours in stagnant air.

Figure 6:
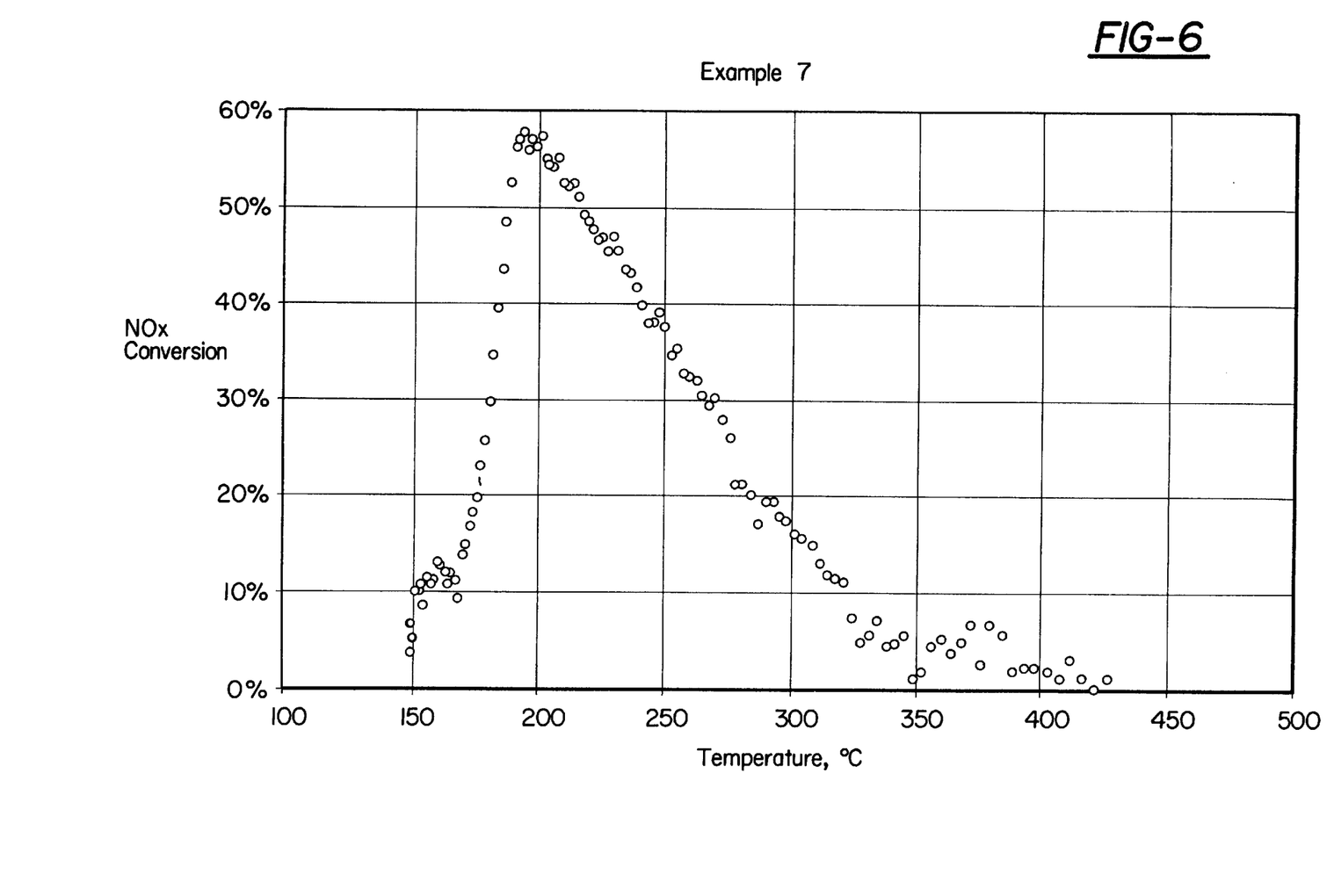

The prepared monolith product was determined by atomic absorption spectrometry to have 1.14% Pt and 0.35% Na, by weight. The $NO_x$ reduction curve is shown in FIG. 6. The maximum $NO_x$ conversion was 57%.

EXAMPLE 8

Addition of Platinum and Palladium to the Hydrous Titanium Oxide/Silica Coated Alumina/Cordierite Monolith and Activation A cordierite with 1 wt. % of platinum and 0.1 wt. % of palladium based on total monolith weight was prepared by ion exchange using a 33% excess of platinum and palladium with respect to the nominal target composition. The excess of the catalyst metals was used because of the less efficient cation exchange with hydrous metal oxide coatings on cordierite substrate, as compared to ion exchange of the hydrous metal oxide by itself.

An approximately 0.92 gram monolith, prepared according to Preparation 3, was suspended in a solution of 0.025 gram $Pt(NH_3)_4(NO_3)_2$ in 50 ml deionized water to which was added 0.034 gram of a 10 wt. % solution of $Pd(NH_3)_4(NO_3)_2$ in deionized water. The solution was stirred gently and the pH lowered to 5.5 using 0.1N nitric acid. The solution was held at pH 5.5 for 30 min. by adding 0.01N nitric acid dropwise as needed. The solution was decanted off and the monolith placed in a Buchner funnel. After pulling a vacuum on the flask for about 2 seconds, the monolith was rinsed with three 25-ml portions of deionized water, and then rinsed with three 25-ml portions of acetone. The monolith was dried on the Buchner funnel at room temperature under vacuum for about one hour.

The monolith was heated at 5° C./minute up to 600° C. and then calcined at that temperature for two hours in stagnant air.

Figure 7:
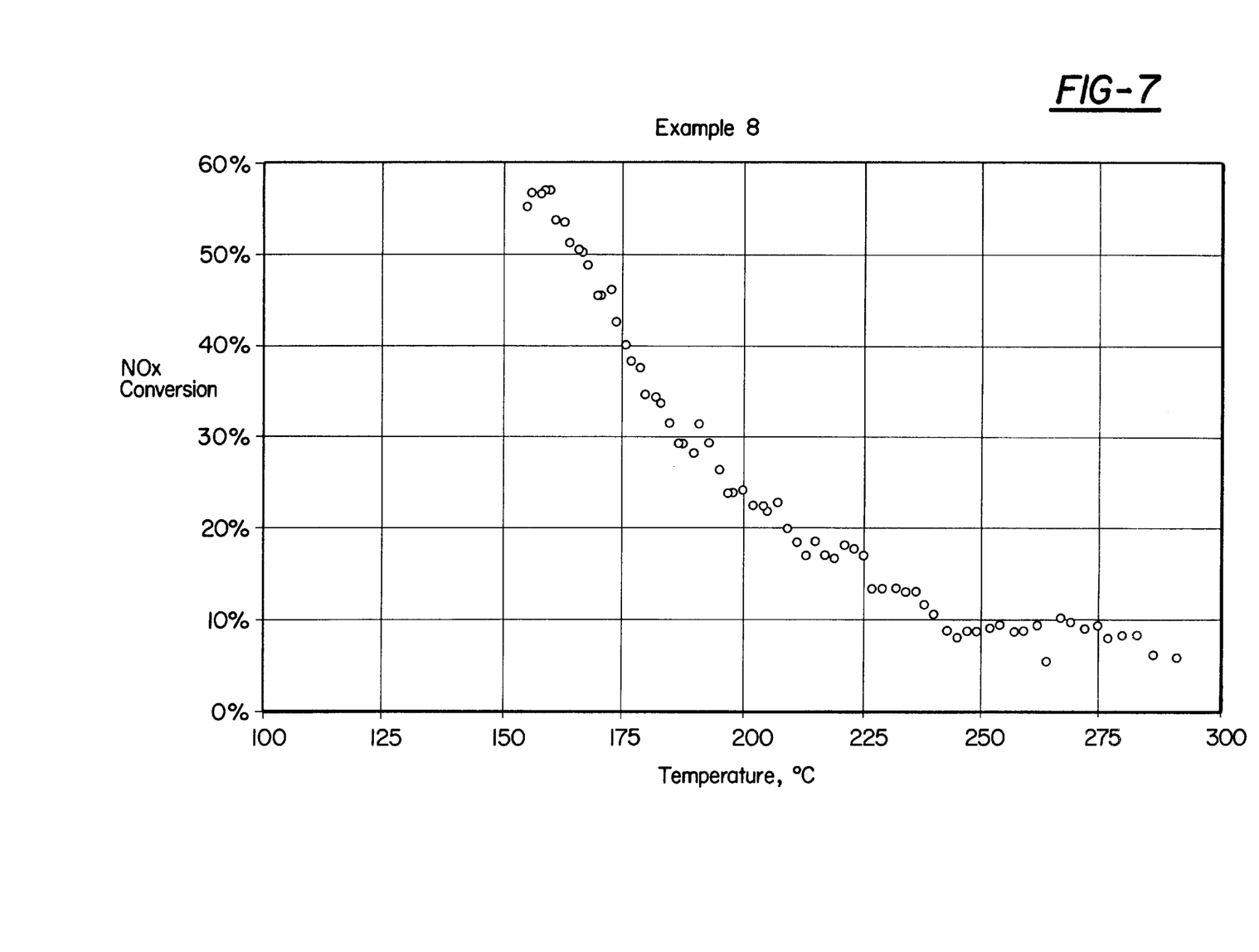

The prepared monolith product was determined by atomic absorption spectrometry to have 1.08% Pt, 0.12% Pd, and 0.31% Na, by weight. The $NO_x$ reduction curve is shown in FIG. 7. The maximum $NO_x$ conversion was 57%.

The invention has been described in detail with reference to preferred embodiments thereof. It should be understood, however, that variations and modifications can be made within the spirit and scope of the invention.

We claim:

1. A catalytic material, comprising an activated noble metal-doped hydrous metal oxide material that includes an amount of sodium effective to broaden the temperature range of appreciable $NO_x$ conversion, wherein the noble metal is selected from the group consisting of platinum, palladium, and mixtures thereof, and further wherein the metal of the metal oxide is selected from the group consisting of titanium, zirconium, and mixtures thereof, the hydrous metal oxide material being doped with a sufficient amount of the noble metal to catalyze reduction of $NO_x$ in an oxidizing atmosphere.

2. A catalytic material according to claim 1, wherein the noble metal is a mixture of platinum and palladium in a ratio of from about 1 to about 20 parts platinum for each part palladium, by weight.

3. A catalytic material according to claim 1, further including silica.

4. A catalytic material according to claim 1, further comprising an amount of silica effective to thermally stabilize the material for temperatures of up to about 1000° C.

5. A catalytic material according to claim 1, wherein the amount of sodium included is effective to broaden the temperature range of appreciable $NO_x$ reduction to a range of at least 50° C.

6. A method of increasing the temperature range of appreciable $NO_x$ reduction in a catalytic material, comprising the steps of:
    (a) making a sodium-doped hydrous metal oxide material, wherein the metal is selected from the group consisting of titanium and zirconium;
    (b) doping the material with a noble metal selected from the group consisting of platinum, palladium, and mixtures thereof, the hydrous metal oxide material being doped with a sufficient amount of the noble metal to catalyze reduction of $NO_x$ in an oxidizing atmosphere, wherein an amount of sodium is left in the material effective to increase the temperature range of appreciable $NO_x$ reduction to at least about a 5° C. span; and
    (c) calcining the material.

7. A method according to claim 6, comprising the additional step of increasing the amount of sodium in the material before calcining the material.

8. A method of making a substrate that catalyzes emissions conversion in an oxidizing exhaust stream from a combustion process, comprising the steps of:
    (a) coating the substrate with an activated noble metal-doped hydrous metal oxide material wherein the noble metal is selected from the group consisting of platinum, palladium, and mixtures thereof, and further wherein the metal of the metal oxide is selected from the group consisting of zirconium, titanium, niobium, tantalum, and mixtures thereof; and
    (b) calcining the coating, the hydrous metal oxide material being doped with a sufficient amount of the noble metal to catalyze reduction of $NO_x$ in an oxidizing atmosphere.

9. A method according to claim 8, wherein the hydrous metal oxide material is doped with from about 0.7 to about 1% platinum and from about 0.1 to about 0.4% palladium, by weight, and further wherein the metal of the metal oxide is selected from the group consisting of zirconium, titanium, and mixtures thereof.

10. A method according to claim 8, wherein the activated noble metal-doped hydrous metal oxide material further comprises silica and up to about 5% sodium by weight.

11. A method according to claim 8, wherein the substrate is selected from the group consisting of a monolith and ceramic beads.

12. A method of reducing light-off temperature for conversion of emissions in an exhaust stream from a combustion process, comprising the steps of:

(a) providing a substrate coated with an activated noble metal-doped hydrous metal oxide, wherein the noble metal is selected from the group consisting of platinum, palladium, and mixtures thereof, the hydrous metal oxide material being doped with a sufficient amount of the noble material to catalyze reduction of $NO_x$ in an oxidizing atmosphere; and further wherein the metal of the metal oxide is selected from the group consisting of zirconium, titanium, niobium, tantalum, and mixtures thereof; and (b) contacting said substrate with said exhaust stream to allow conversion of the emissions by said activated noble metal-doped hydrous metal oxide, wherein the light-off temperature is reduced to less than 250° C.

13. A method according to claim 12, wherein the activated noble metal-doped hydrous metal oxide comprises up to 5% sodium.

14. A method according to claim 12, wherein the metal of the metal oxide is selected from the group consisting of zirconium, titanium, and mixtures thereof; and further wherein the noble metal is a mixture of platinum and palladium.

15. A method according to claim 14, wherein the hydrous metal oxide material is doped with from about 0.7 to about 1% platinum and from about 0.1 to about 0.4% palladium, by weight.

16. A device for reducing $NO_x$ in an exhaust stream from a combustion process, comprising a substrate coated with an activated hydrous metal oxide material doped with at least one noble metal selected from the group consisting of platinum, palladium, and mixtures thereof, the hydrous metal oxide material being doped with a sufficient amount of the noble metal to catalyze reduction of $NO_x$ in an oxidizing atmosphere; wherein the metal of the metal oxide is selected from the group consisting of zirconium, titanium, niobium, tantalum, and mixtures thereof.

17. A device according to claim 16, wherein the hydrous metal oxide material is doped with up to 5% platinum, by weight.

18. A device according to claim 16, wherein the hydrous metal oxide material is doped with from about 0.7 to about 1% platinum and from about 0.1 to about 0.43% palladium, by weight and further wherein the hydrous metal oxide comprises up to about 5% sodium by weight.

19. A device according to claim 16, wherein the substrate comprises a monolith or ceramic beads.

20. A device according to claim 19, wherein the device further comprises a layer of high-surface area ceramic between the substrate and the activated hydrous metal oxide material coating.

21. A device according to claim 20, wherein the high-surface area ceramic is γ-alumina.

22. A combustion apparatus, comprising a unit in which combustion occurs and an exhaust system for combustion products connected to said unit, said exhaust system comprising a material for reducing $NO_x$ in an oxidizing atmosphere and means for directing an exhaust stream of said combustion products into contact with said material, wherein said material is an activated hydrous metal oxide material doped with at least one noble metal selected from the group consisting of platinum, palladium, and mixtures thereof, and wherein the metal of the metal oxide is selected from the group consisting of zirconium, titanium, niobium, tantalum, and mixtures thereof.

23. A combustion apparatus according to claim 22, wherein said unit is an internal combustion engine.

24. An exhaust system for an exhaust stream from a combustion process, comprising as means for reducing $NO_x$ in an oxidizing atmosphere comprises an activated hydrous metal oxide material doped with at least one noble metal selected from the group consisting of platinum, palladium, and mixtures thereof, the hydrous metal oxide material being doped with a sufficient amount of the noble metal to catalyze reduction of $NO_x$ in an oxidizing atmosphere, wherein the metal of the metal oxide is selected from the group consisting of zirconium, titanium, niobium, tantalum, and mixtures thereof.

25. A method of reducing $NO_x$, in an oxidizing atmosphere, comprising the steps of:

(a) providing a substrate coated with an activated hydrous metal oxide material doped with at least one noble metal selected from the group consisting of platinum, palladium, and mixtures thereof, the hydrous metal oxide material being doped with a sufficient amount of the noble metal to catalyze reduction of $NO_x$ in an oxidizing atmosphere, wherein the metal of the metal oxide is selected from the group consisting of zirconium, titanium, niobium, tantalum, and mixtures thereof;

(b) providing an exhaust gas stream having an oxidizing atmosphere; and (c) contacting said substrate with said stream to allow said substrate to reduce reducing $NO_x$ in said stream.

* * * * *